(12) United States Patent
Vadamalayan et al.

(10) Patent No.: US 11,354,863 B2
(45) Date of Patent: Jun. 7, 2022

(54) SYSTEMS AND METHODS FOR IMMERSIVE AND COLLABORATIVE VIDEO SURVEILLANCE

(71) Applicant: Honeywell International Inc., Morristown, NJ (US)

(72) Inventors: MuthuRamji Vadamalayan, Chennai (IN); Deepakumar Subbian, Gland (CH); Kathiresan Periyasamy, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 118 days.

(21) Appl. No.: 15/198,377

(22) Filed: Jun. 30, 2016

(65) Prior Publication Data
US 2018/0005436 A1 Jan. 4, 2018

(51) Int. Cl.
G06T 19/00 (2011.01)
G08B 13/196 (2006.01)
H04N 7/18 (2006.01)

(52) U.S. Cl.
CPC ...... G06T 19/006 (2013.01); G08B 13/19678 (2013.01); H04N 7/183 (2013.01)

(58) Field of Classification Search
CPC ....... G06T 19/006; G06T 19/20; G06T 11/60; G06T 2200/04; G06T 2207/20081; G06T 2207/30221; G06T 13/40; G06T 19/00; G06T 2219/024; G06T 2219/2004; G06T 15/005; G06T 15/20; G06F 3/011; G06F 3/012; G06F 3/04842; G06F 3/0484; G06F 3/04883; G06F 3/0482; G06F 40/14; G06F 8/10; G06F 8/20; G06F 8/51; G06F 9/455; G06F 3/0488; G06F 3/04886; G06F 3/04845; G06F 3/03547; G06F 3/038;
(Continued)

(56) References Cited

U.S. PATENT DOCUMENTS 8,063,936 B2 11/2011 Samarasekera et al.
8,682,502 B2 * 3/2014 Jurmain ..................... B25J 3/04
700/17
(Continued)

FOREIGN PATENT DOCUMENTS

WO 2012/153805 A1 11/2012

OTHER PUBLICATIONS

Giroptic 360cam | HD 360 degree camera | US Store, http://us.360.tv/en, May 31, 2016.
(Continued)

Primary Examiner — John W Miller
Assistant Examiner — Sean N. Haiem
(74) Attorney, Agent, or Firm — Seager, Tufte & Wickhem, LLP

(57) ABSTRACT

Systems and methods for immersive and collaborative video surveillance, in the commercial security industry are provided. Some methods can include receiving a video data stream from a surveillance camera in a monitored region via a cloud network, a user interface device of or coupled to a virtual reality headset displaying the video data stream, and the user interface device receiving user input corresponding to a movement of a user's body to navigate the video data stream and simulate the user navigating the monitored region from within the monitored region.

12 Claims, 2 Drawing Sheets

US 11,354,863 B2
Page 2

(58) Field of Classification Search
CPC ......... H04N 7/181; H04N 7/183; H04N 7/18;
H04N 5/23238; H04N 7/185; H04N
5/247; H04N 7/188; H04N 5/23293;
H04N 5/23296; H04N 5/232; G06K
9/00771; G06K 2009/00738; G06K
9/00718; G06K 9/00335; G05B 19/05;
G05B 19/4185; G05B 2219/14124; G05B
2219/32126; G05B 19/056; G05B
2219/15012; G05B 2219/13156; G05B
2219/13158; G05B 2219/13161; G05B
19/4183; G06N 20/00; G06N 3/02; G06N
5/046; G06N 7/005; G06N 3/006; G06N
3/0445; G06N 3/0454; G06N 3/0472;
G06N 3/084; G06N 3/088; G06N 3/126;
G06N 3/0427; G06N 3/08; G06N 5/047;
G08B 13/19678
USPC ........................................................ 348/143
See application file for complete search history.

(56) References Cited

U.S. PATENT DOCUMENTS

| | | | | |
|---|---|---|---|---|
| 9,065,987 | B2* | 6/2015 | Kasmir | H04N 7/186 |
| 9,485,459 | B2* | 11/2016 | Shoemake | G06F 3/011 |
| 10,217,003 | B2* | 2/2019 | Renkis | H04N 7/181 |
| 10,242,501 | B1* | 3/2019 | Pusch | G06T 19/006 |
| 2007/0005795 | A1 | 1/2007 | Gonzalez | |
| 2008/0263592 | A1* | 10/2008 | Kimber | G06F 3/0486 |
| | | | | 725/38 |
| 2010/0100256 | A1* | 4/2010 | Jurmain | B25J 3/04 |
| | | | | 701/2 |
| 2010/0280836 | A1* | 11/2010 | Lu | G08B 7/062 |
| | | | | 705/1.1 |
| 2012/0079119 | A1* | 3/2012 | Gill | H04L 67/125 |
| | | | | 709/227 |
| 2012/0113145 | A1 | 5/2012 | Adhikari et al. | |
| 2013/0083003 | A1* | 4/2013 | Perez | A63F 13/79 |
| | | | | 345/419 |
| 2014/0020072 | A1* | 1/2014 | Thomas | H04L 63/0815 |
| | | | | 726/7 |
| 2014/0171039 | A1* | 6/2014 | Bjontegard | H04L 67/38 |
| | | | | 455/414.1 |
| 2014/0375752 | A1* | 12/2014 | Shoemake | G06F 3/011 |
| | | | | 348/14.07 |
| 2015/0029335 | A1* | 1/2015 | Kasmir | H04N 7/186 |
| | | | | 348/143 |
| 2015/0124087 | A1* | 5/2015 | Jones, Jr | G08B 19/005 |
| | | | | 348/143 |
| 2015/0153922 | A1* | 6/2015 | Ballard | G06F 3/04812 |
| | | | | 345/156 |
| 2015/0309316 | A1* | 10/2015 | Osterhout | G06F 1/163 |
| | | | | 345/8 |
| 2015/0317418 | A1* | 11/2015 | Sankarapandian | G06F 30/20 |
| | | | | 703/1 |
| 2015/0319411 | A1* | 11/2015 | Kasmir | G08B 13/19684 |
| | | | | 348/143 |
| 2015/0334344 | A1* | 11/2015 | Shoemake | G06F 3/011 |
| | | | | 348/14.16 |
| 2015/0338915 | A1* | 11/2015 | Publicover | H04N 5/247 |
| | | | | 345/633 |
| 2015/0341603 | A1* | 11/2015 | Kasmir | H04N 5/33 |
| | | | | 348/143 |
| 2015/0379358 | A1* | 12/2015 | Renkis | G06K 9/00771 |
| | | | | 348/159 |
| 2015/0381944 | A1* | 12/2015 | Renkis | H04N 7/181 |
| | | | | 348/48 |
| 2015/0381945 | A1* | 12/2015 | Renkis | G06K 9/00771 |
| | | | | 348/48 |
| 2015/0381946 | A1* | 12/2015 | Renkis | G08B 13/19656 |
| | | | | 348/47 |
| 2015/0381947 | A1* | 12/2015 | Renkis | H04N 7/181 |
| | | | | 348/159 |
| 2015/0381948 | A1* | 12/2015 | Renkis | H04L 67/02 |
| | | | | 348/47 |
| 2016/0021344 | A1* | 1/2016 | Renkis | H04N 7/181 |
| | | | | 348/48 |
| 2016/0093105 | A1* | 3/2016 | Rimon | G06T 11/60 |
| | | | | 345/633 |
| 2016/0127690 | A1 | 5/2016 | Kaehler et al. | |
| 2016/0178906 | A1* | 6/2016 | Rider | H04W 12/06 |
| | | | | 726/17 |
| 2016/0267759 | A1* | 9/2016 | Kerzner | G08B 13/19682 |
| 2016/0267884 | A1* | 9/2016 | Binstock | G09G 5/373 |
| 2016/0316176 | A1* | 10/2016 | Laska | G06K 9/00711 |
| 2016/0379321 | A1* | 12/2016 | Abraham | G06F 3/167 |
| | | | | 705/26.63 |
| 2017/0026635 | A1* | 1/2017 | Nadler | H04N 13/167 |
| 2017/0039829 | A1* | 2/2017 | Kerzner | G08B 13/19645 |
| 2017/0102833 | A1* | 4/2017 | Kodali | G06F 3/0481 |
| 2017/0200252 | A1* | 7/2017 | Nguyen | G06F 13/4239 |
| 2017/0213387 | A1* | 7/2017 | Bean | G06F 3/012 |
| 2017/0263091 | A1* | 9/2017 | Kerzner | G08B 13/19645 |
| 2017/0300758 | A1* | 10/2017 | Renkis | H04N 7/181 |

OTHER PUBLICATIONS

Google Cardboard—Google VR, https://vr.google.com/cardboard/index.html, May 31, 2016.
Samsung Gear VR—The Official Samsung Galaxy Site, http://www.samsung.com/global/galaxy/wearables/gear-vr/, May 31, 2016.
Epson Moverio BT-300 and BT-200 Smart Glasses—Epson America, Inc., http://www.epson.com/egi-bin/Store/jsp/Landing/moverio-augmented-reality-smart-glasses.do.
May 31, 2016.
Home—nod, https://nod.com/, May 31, 2016.
Extended European search report for corresponding EP patent application 17176465.7, dated Oct. 17, 2017.
Shrutik Karchhi et al., A Review Paper on Oculus Rift, International Journal of Current Engineering and Technology, pp. 3589 to 3592, vol. 4, No. 5, Inpressco International Press Corporation, Oct. 20, 2014.
Chinese First Office Action, Patent Application No. 201710514775, pp. 12, dated May 29, 2020.
Office Action from India Patent Application No. 201714021580, dated Apr. 9, 2021 (5 pages).

* cited by examiner

SYSTEMS AND METHODS FOR IMMERSIVE AND COLLABORATIVE VIDEO SURVEILLANCE

FIELD

The present invention relates generally to video surveillance. More particularly, the present invention relates to systems and methods for immersive and collaborative video surveillance.

BACKGROUND

Some known surveillance systems of large scale distributed sites, such as banks, refineries, and the like, include a central control room with a large wall of monitors for displaying video from surveillance cameras throughout the site as well as multiple operators for viewing the monitors and working together to monitor both steady state and crisis situations throughout the site, such as during alarm events. Operators or other users of these types of desktop-based systems can control the monitors and other parts of the system via user input devices, such as, for example, a joystick and the like. However, such control rooms are expensive and require the operators to be located in the same control room. Furthermore, because of the number of monitors in these types of control rooms, it can be difficult to identify some events, such as organized crime, parts of which may be displayed on many different monitors.

Cloud-based surveillance systems are also known for monitoring and controlling situations across multiple sites that are geographically distributed. For example, cloud-based surveillance systems can monitor and control small or medium sized businesses with multiple remote sites connected via a cloud network. In such systems, a central control room is not economically feasible so, while central monitoring stations exist in some known systems, they usually only monitor intrusion events.

Accordingly, users of known cloud-based surveillance systems monitor the system by remotely viewing surveillance video via a web or mobile interface and controlling the interface and other parts of the system via user input devices, such as, for example, a mouse, a touch-based screen, and the like. While useful, such interfaces fail to provide the user with an immersive experience of live and recorded video, similar to the experience of being in an on-site central control room. Indeed, while such interfaces can include two-dimensional or three-dimensional maps, a user must lay such maps side by side using a web or desktop application and use buttons, menu controls, or other input devices to operate on the maps, thereby preventing the simulation of a real-time experience of an on-site central control room. Furthermore, such interfaces require users at remote locations to share their viewing screens or communicate via a telephone to collaboratively investigate an incident rather than simultaneously viewing live or recorded video of a common scene.

In view of the above, there is a continuing, ongoing need for improved surveillance systems.

DETAILED DESCRIPTION

Figure 1A:
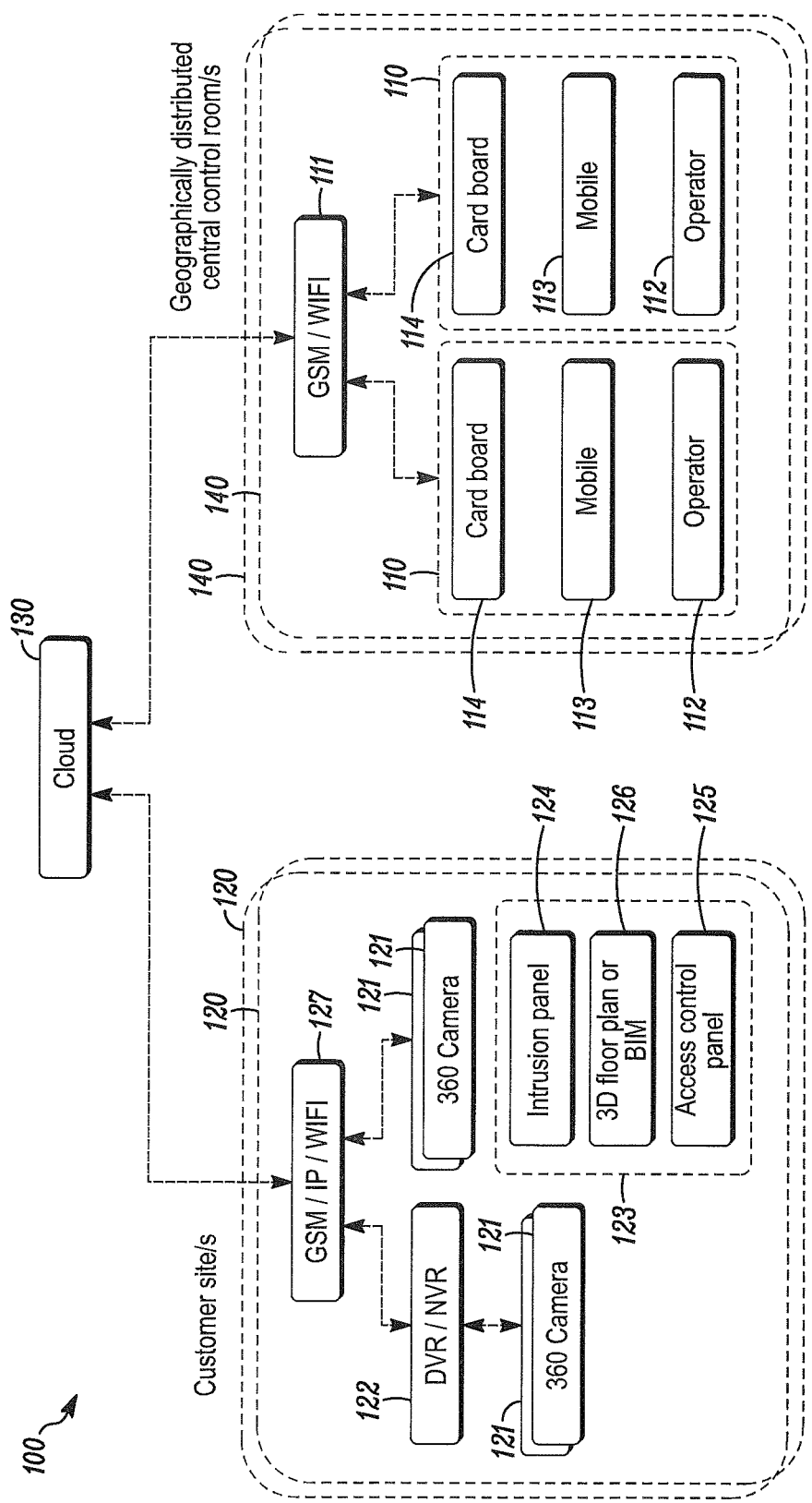
FIG. 1A is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for immersive and collaborative video surveillance, for example, in the commercial security industry. In some embodiments, systems and methods disclosed herein can facilitate a user or a plurality of users collaborating via a cloud network to perform video surveillance and investigations by simultaneously viewing video of a common scene. Furthermore, in some embodiments, systems and methods disclosed herein can combine one or more surveillance cameras with a cloud network based software as a service (SaaS) solution to facilitate a plurality of users performing remote and immersive video surveillance and collaborating via the cloud network.

In some embodiments, systems and methods disclosed herein can include a primary user interface, such as, for example, a three-dimensional virtual reality headset, via which a user can interact with a monitored region and view video of a common scene in the monitored region and that can allow the user to virtually inspect, tour, or walk through the monitored region. The video can be recorded or viewed in real time.

In some embodiments, the video of the common scene can include or be obtained from a three-dimensional BIM model of a floorplan of the monitored region, video from a two-dimensional surveillance camera, video from a 360° panoramic surveillance camera, and the like, via the cloud network. When the video of the common scene is obtained from a surveillance camera, the video and a representation of the camera can be overlaid on a representation of the BIM model or floorplan displayed on a user interface of the primary user interface, such as the virtual reality headset, and a user can rotate the user interface up, down, or side to side, by rotating his head up, down, or side to side, to see the video obtained by the camera at different angles, thereby virtually monitoring a region captured by the camera. In some embodiments, a representation of a human hand or finger can be overlaid on the representation of the BIM model or floorplan displayed on the user interface of the primary user interface, and a user can control the representation of the human hand or finger by providing input into the user interface to navigate through the video of the monitored region.

In some embodiments, a plurality of users can view video of the common scene via respective primary user interfaces. For example, in some embodiments, each of the plurality to users can view the video of the common scene via respective virtual reality headsets and can communicate with each other via the cloud network to exchange information.

In some embodiments, the status of access devices or intrusion devices in the monitored region can also be transmitted to the cloud network and viewed by a user via a respective primary user interface. For example, in some embodiments, the status of or other information related to devices in the monitored region can be overlaid on the video of the common scene in a location that corresponds to the location of the respective device in the monitored region. Accordingly, the user can monitor the status and health of the region as if he were inside of the region.

In some embodiments, systems and methods disclosed herein can construct a virtual command center, in lieu of an on-site central control room, via which users can view video of common scenes, communicate with each other, and view the status of devices in the monitored region, all via the cloud network. For example, in some embodiments a first user can view live video of a common scene while a second user can view recorded video of the common scene, and the first and second user can communicate with one other via the cloud network.

In accordance with disclosed embodiments, a user in a central control room, or any other user in any other location, can perform video surveillance and virtually experience being in a monitored region from which video is obtained. For example, a surveillance application can be installed and executed on a mobile device, such as, for example, a smart phone or other personal digital assistant, which can be mounted to a virtual reality headset, including a headset with an eyeglass shaped cardboard, a headset that receives a smart phone, glasses with lenses displaying video in a user's field of vision, a headset that communicates with a smart phone wirelessly or via a hard wired connection or mount, or any other virtual reality headset as would be known by those of skill in the art. In some embodiments, the surveillance application or the mobile device can be placed in a virtual reality mode to facilitate the user performing video surveillance.

Videos and photographs obtained from security cameras in a monitored region can be rendered by the surveillance application on the mobile device to facilitate a user of the mobile device monitoring the region as if he were inside of the region. Such video surveillance can aid in identifying human movement and interaction within a monitored region, such as in instances of organized crime that can be spread out over different areas of a monitored region, or can be used in forensic surveillance to identify and search for suspects as they enter into and move throughout a monitored region. For example, the cloud network as disclosed herein can process raw video obtained by cameras in the monitored region to ready the video for forensic searching and the like.

In some embodiments, a user of the surveillance application or the mobile device can control one or more devices in the monitored region via the surveillance application or the mobile device. For example, in some embodiments, a user can control a surveillance camera, an access control panel, or an intrusion panel in the monitored region by entering a voice command entered into mobile device. The surveillance application can process the received voice command and transmit a corresponding instruction signal to the respective device in the monitored region, via the cloud network.

Figure 1B:
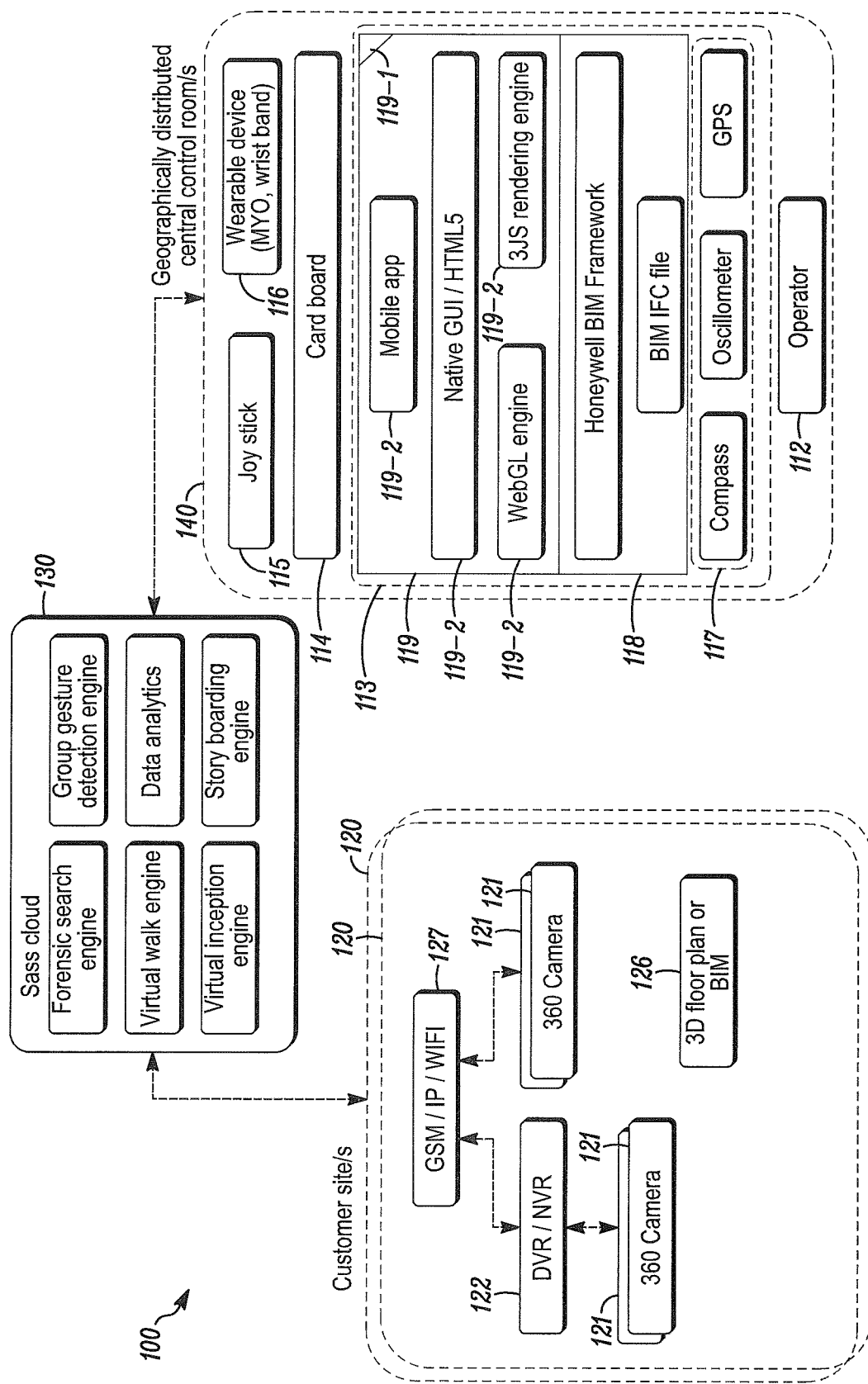
FIG. 1B is a block diagram of a system in accordance with disclosed embodiments.

FIG. 1A and FIG. 1B are block diagrams of a system 100 in accordance with disclosed embodiments. As seen in FIGS. 1A and 1B, the system 100 can include a plurality of user interface devices 110 communicating with a plurality of monitored regions 120 via a cloud network 130.

Each of the monitored regions 120 can include one or more surveillance cameras 121, one or more recording devices 122, and a control panel device 123 that includes an intrusion panel device 124, an access control panel device 125, and a three-dimensional floor plan or BIM 126 of the respective monitored region 120 stored in a memory device of the control panel device 123. As seen, one or more of the devices in the monitored region 120 can communicate with the cloud network 130 via a GSM, IP, or WiFi network 127.

Each of the user interface devices 110 can be geographically distributed, can be located inside or outside of one or more central control rooms 140, and can communicate with the cloud network 130 via a GSM or WiFi network 111. As best seen in FIG. 1A, in some embodiments, each of the user interface devices 110 can include a user 112 interacting with a mobile device 113, which can be coupled to a virtual reality headset 114, for example. In some embodiments, each of the user interface devices 110 can additionally or alternatively include a joystick 115 or a wearable device 116.

As best seen in FIG. 1B, the mobile device 113 can include one or more directional devices 117, such as a compass, oscillator, or GPS device. The mobile device 113 can also include a memory device 118, control circuitry 119, one or more programmable processors 119-1, and executable control software 119-2 stored on a non-transitory computer readable medium. In some embodiments, the control software 119-2 can include one or more of a surveillance application, a GUI or HTML application, a web engine, or a rendering engine, and the memory device 118 can include a floor plan or BIM file of one or more monitored regions 120.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving a video data stream from a surveillance camera in a monitored region via a cloud network;
   a first user interface device of or coupled to a first virtual reality headset displaying the video data stream overlaid on a representation of a BIM model or a floorplan of the monitored region;
   the first user interface device receiving first user input corresponding to a movement of a first user's body;
   the first user interface device simulating the first user navigating the monitored region from within the monitored region by adjusting a presentation of the video data stream received from the surveillance camera in a monitored region in response to the first user input;
   the first user interface device receiving second user input for controlling one or more access control panels in the monitored region, and in response to receiving the second user input, transmitting an instruction signal corresponding to the second user input to the one or more access control panels in the monitored region, via the cloud network, to control one or more access control devices of the monitored region with the first virtual reality headset; and
   the first user interface transmitting and receiving communication signals to and from a second user interface device of or coupled to a second virtual reality headset, via the cloud network, to communicate with a second user, wherein the second user interface device also displays the video data stream received from the surveillance camera in the monitored region.

2. The method of claim 1 further comprising retrieving the BIM model or the floorplan of the monitored region from a memory device.

3. The method of claim 1 further comprising the first user interface device displaying a representation of the surveillance camera on the representation of the BIM model or the floorplan of the monitored region in a location on the representation of the BIM model or the floorplan that corresponds to a physical location of the surveillance camera in the monitored region.

4. The method of claim 1 further comprising the first user interface device displaying a status of the one or more of the access control panels in the monitored region overlaid on the video data stream and the representation of the BIM model or the floorplan of the monitored region.

5. The method of claim 4 further comprising the first user interface device displaying the status and a representation of the one or more access control panels overlaid on the video data stream and the representation of the BIM model or the floorplan of the monitored region in locations on the representation of the BIM model or the floorplan that correspond to physical locations of the one or more access control panels in the monitored region.

6. A method comprising:
   receiving a video data stream from a surveillance camera located in a monitored region via a cloud network, the video data stream depicting a scene in the monitored region;
   a first user interface device, remote from the monitored region, displaying at least part of the video data stream overlaid on a representation of a BIM model or a floorplan of the monitored region;
   a second user interface device, remote from the monitored region, displaying at least part of the video data stream overlaid on the representation of the BIM model or the floorplan of the monitored region, the second user interface device displaying the at least part of the video data stream in temporal alignment with the least part of the video data stream that is displayed on the first user interface device;
   the first user interface device receiving first user input from a first user;
   the first user interface device simulating the first user navigating the monitored region from within the monitored region by adjusting a presentation of the video data stream received from the surveillance camera in the monitored region in response to the first user input;
   the first user interface transmitting and receiving communication signals to and/or from the second user interface device, via the cloud network, to communicate with a second user about events observed in the shared video data stream; and
   the first user interface device receiving second user input from the first user for controlling one or more access control panels in the monitored region, and in response to receiving the second user input, transmitting an instruction signal corresponding to the second user input to the one or more access control panels in the monitored region, via the cloud network, to control the one or more access control devices of the monitored region with the first user interface device.

7. The method of claim 6 wherein the video data stream includes a live feed of the scene from the surveillance camera or a recorded feed of the scene from the surveillance camera.

8. A system comprising:
   a first user interface device that is part of or is coupled to a first virtual reality headset;
   a second user interface device remote from the first virtual reality headset;
   wherein the first virtual reality headset receives via a cloud network at least part of a video data stream captured by a surveillance camera located in a monitored region and displays at least part of the received video data stream on the first user interface device of the first virtual reality headset,
   wherein the second user interface device receives via the cloud network at least part of the video data stream captured by the surveillance camera and displays at least part of the received video data stream on the second user interface device temporarily aligned with the least part of the received video data stream that is displayed on the first user interface device of the first virtual reality headset,
   wherein the first user interface device of the first virtual reality headset displays the received video data stream overlaid on a representation of a BIM model or a floorplan of the monitored region,
   wherein the first virtual reality headset receives first user input corresponding to a movement of a first user's body,
   wherein the first user interface device of the first virtual reality headset presents the video data stream received from the surveillance camera in a manner that corresponding to the first user input to simulate the first user navigating the monitored region from within the monitored region, and
   the first virtual reality headset transmits and receives communication signals to and from the second user interface device, via the cloud network, to communicate with a second user about events observed in the video data stream.

9. The system of claim 8 wherein the first virtual reality headset receives the BIM model or the floorplan of the monitored region via the cloud network.

10. The system of claim 8 wherein the first user interface device of the first virtual reality headset displays a representation of the surveillance camera on the representation of the BIM model or the floorplan of the monitored region in a location on the representation of the BIM model or the floorplan that corresponds to a physical location of the surveillance camera in the monitored region.

11. The system of claim 8 wherein the first user interface device of the first virtual reality headset displays a status of the one or more access control panels in the monitored region overlaid on the video data stream and the representation of the BIM model or the floorplan of the monitored region.

12. The system of claim 11 wherein the first user interface device of the first virtual reality headset displays the status and a representation of the one or more access control panels overlaid on the video data stream and the representation of the BIM model or the floorplan of the monitored region in locations on the representation of the BIM model or the floorplan that corresponds to physical locations of the one or more access control panels in the monitored region.

* * * * *